Sept. 27, 1960 J. C. BOESCH, JR., ET AL 2,953,887
ROTARY IMPELLER TYPE HARVESTER
Filed April 3, 1957 2 Sheets-Sheet 1
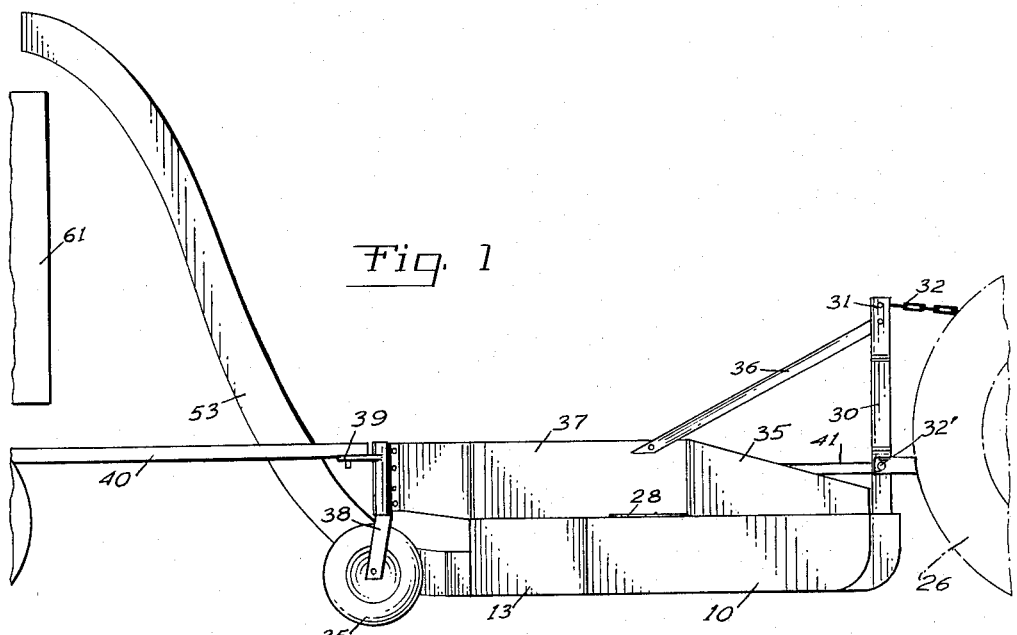
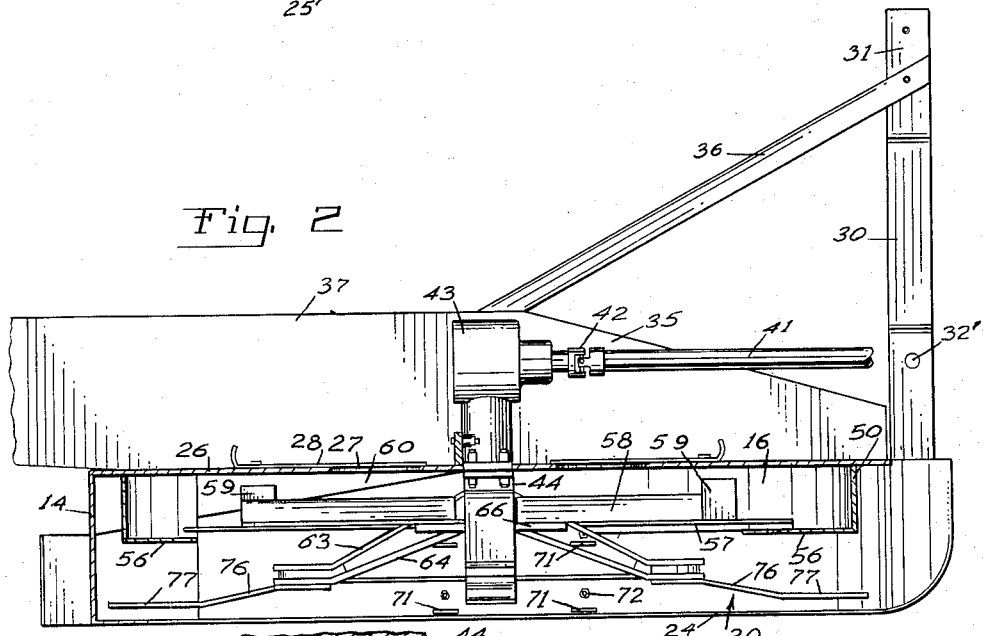
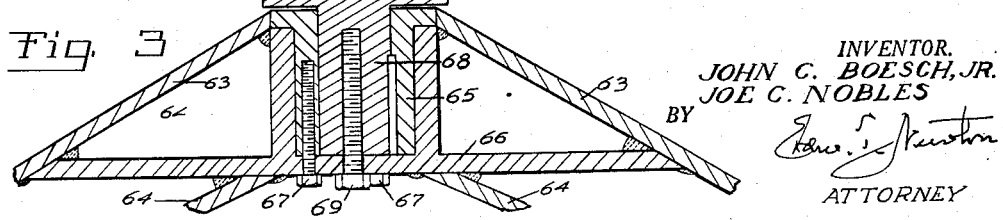
INVENTOR.
JOHN C. BOESCH, JR.
JOE C. NOBLES
BY
ATTORNEY Sept. 27, 1960     J. C. BOESCH, JR., ET AL     2,953,887
ROTARY IMPELLER TYPE HARVESTER
Filed April 3, 1957            2 Sheets-Sheet 2
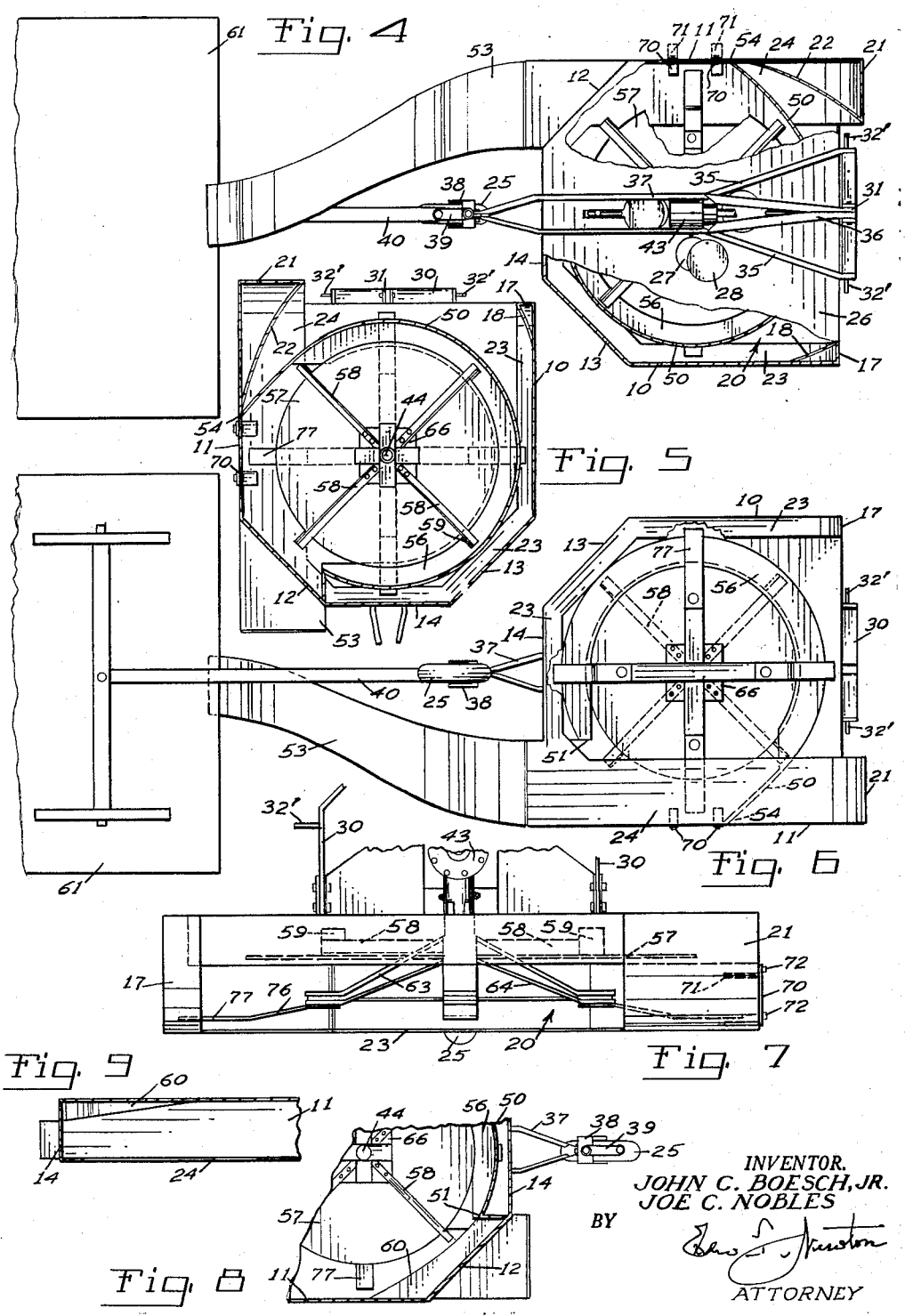
INVENTOR.
JOHN C. BOESCH, JR.
JOE C. NOBLES
BY
ATTORNEY

United States Patent Office 2,953,887
Patented Sept. 27, 1960

2,953,887

ROTARY IMPELLER-TYPE HARVESTER

John C. Boesch, Jr., and Joe C. Nobles, Albany, Ga., assignors to Lilliston Implement Company, Albany, Ga., a corporation of Georgia Filed Apr. 3, 1957, Ser. No. 650,441

15 Claims. (Cl. 56—23)

This invention relates to forage harvesters and is particularly concerned with a rotary type green forage harvester including air means for the conveyance of the severed crop to a vehicle movable with the harvester.

The harvesting of green forage has become increasingly popular since the recognition of the fact that the harvesting of such forage and feeding of the severed crop to stock is more efficient and economical than the use of the land bearing such crops as grazing land. However, the harvesting of such crops presents problems beyond those normally confronting the harvester of mature and relatively dry materials. One of the problems is the necessity for precluding the contact of the cut drop with dirt, dust and other foreign matter. Since the green forage exudes a usually tacky and adhesive sap, foreign matter of the nature referred to will adhere to and cling to the severed crop if contact is permitted. Such green forage also is of substantial weight as compared with the lighter dry crops and hence the problems of conveyance are more difficult. Furthermore, since such growing crops are more limber and pliant in their stem structures than mature and dried crops it is also necessary to provide more effective and efficient structures for harvesting of such crops and particularly with respect to the cutting means.

In general terms, it is therefore among the objects of the present invention to provide a novel and improved harvester particularly designed for the gathering of green forage crops.

More specifically, it is an object of the present invention to provide in a device of the character described the combination of rotary cutting means with a rotary air impeller arrangement by means of which an induced air current is caused to engage the crop and blades in a restricted area within the confines of the apparatus so as to effectively and efficiently induce discharge of the severed crop and to avoid contact thereof with dirt and/or foreign matter.

Another object of the present invention is to provide in a device of the character described structural means by which the entry of the unsevered crop is facilitated and by which such crop is gathered to the cutting blades as an incident to the travel of the device.

It is also among the objects of the present invention to provide a novel and improved blade structure by which rotary motion thereof will provide for severance of the standing crop and through which means efficiency is maintained while the danger of injury to the blades through inadvertent engagement thereof with unyielding elements is minimized.

A further object of the invention is to provide cutting means effectively operable to communicate the crop after severance.

Numerous other objects, features and advantages of the present invention will be apparent from consideration of the following specification taken in conjunction with the accompanying drawings, in which:

Fig. 1 is a side elevation of one preferred form of the present invention.

Fig. 2 is a vertical cross-sectional view through that form of the device shown in Fig. 1.

Fig. 3 is a vertical cross-sectional view of a detail showing the cutter mounting.

Fig. 4 is a top plan view of the device with portions broken away.

Fig. 5 is a top plan view, with the cover removed, rotated through 90 degrees.

Fig. 6 is a bottom plan view, with parts broken away.

Fig. 7 is a fragmentary front elevation.

Fig. 8 is a fragmentary horizontal cross-sectional view showing the air directing baffle.

Fig. 9 is a vertical cross-sectional view of a detail showing the baffle illustrated in Fig. 8.

While the present inventive concept may be carried out with respect to many of the features herein referred to through the use of structures other than that specifically herein presented, that form of the invention herein shown by way of illustration may be characterized as including a housing structure of generally rectangular horizontal cross-section and generally rectangular vertical cross-section within which means are provided for horizontally dividing the body to provide separated air impelling and crop severing chambers. An important feature of the present invention is that air induced to flow in the impeller chamber is restricted in its passage therefrom to contact with the crop at a minor portion of the periphery of the chamber so as to more effectively and efficiently utilize the air flow and further to preclude the contact of the air with the cutting blades during severance of the crop where such contact might induce contact of the severed crop with dirt or other foreign matter. A further characteristic of the present invention is the provision of a novel and improved cutting assembly including freely pivotally mounted blades which may yield in pivotal movement in response to contact with unyielding matter such as stones and the like. The device also provides removable communicating blades to be mounted adjacent the path of travel of the cutter.

Referring now more particularly to the drawings, it will be seen that the device comprises a body or casing shell having vertical side walls 10 and 11 together with inwardly inclined rear panels 12 and 13 and a transverse vertical rear wall 14. As indicated more clearly in Fig. 7, the front of the casing is open so as to permit entry of the unsevered forage. As here presented, the side wall 10 opposite the side from which the severed harvest is discharged to the rear is somewhat shorter than its opposite side 11. Since it is desirable to provide a circular path of travel for the cutting blades greater than the width of the swath to be cut, there is a short inwardly extending front wall 17 associated with the side 10 and a corner baffle 18 may be provided inwardly between the walls 17 and 10 to define a generally circular wall structure confining the cutter assembly and defining a circular cutting chamber generally indicated by the numeral 20. As will be noted from the arrow in Fig. 4, the rotation of the impeller and cutter blades is in counterclockwise direction, as shown in that figure, and the side wall 11 is extended forwardly beyond side wall 10. Since, upon impact of the blade with the standing crop, there may be a transverse impingement of the material at the forward edge and thus the projected portion of the side 11 will receive such material as may be impinged sideways. The forward wall 21 adjacent the longer side 11 is wider than the companion opposite side 17 and the baffle 22 corresponding to the opposite baffle 18 is hence larger and more gently curved in order to facilitate the inward movement of the severed crop.

At the lower edges of the sides 10, 13 and 14, there is provided an inwardly extending flange 23 which provides a narrow peripheral bottom ledge for the shorter sides and across the back of the cutting chamber 20 and whereby the cutter blades are restricted in their effective cutting area to the width of the front opening between the walls 17 and 21. On the opposite side, a similar but wider internally extending bottom flange 24 is provided, the arrangement being such that the wider side construction will define a front opening slightly displaced with respect to the center of rotation of the cutter blade. The rearward discharge of the severed crop is from the broader side. This arrangement provides for ample space in which the forage may be doffed from the blades and rearwardly delivered by air flow, and the wide flange 24 prevents contact of the severed crop with the ground.

It will also be noted that while the apparatus is to be moved over the crop in a spaced relation with respect to the ground level, as by its own wheel 25 and the tractor wheel 26, nevertheless the bottom walls 23 and 24 may at times contact the ground and since in the operation of the device the narrow flange 23 will rest upon and travel over the unsevered crop, its width is kept to a minimum. On the other hand, the side 11 traverses the crop area already cut and hence this broad inwardly extending flange 24 may provide an effective support and ground contact area. The side walls 10, 11, 12 and 13 are joined by a flat cover 26 through which air entry apertures 27 are formed, provided with adjustable cover plates 28.

The machine is adapted to be drawn over the field to be harvested by a tractor, a wheel of which is indicated at 26, the harvester being connected to the tractor by a convenient type of tractor hitch. The drive connection arrangement as here shown includes a vertically upstanding pair of side arms 30 which are bent inwardly to be joined as at 31. A chain 32 from the tractor provides for pivotal adjustment of the machine. The arrangement here presented constitutes a conventional three-point hitch including lift pins 32'. The arms 30 are connected at their lower ends with inwardly extending members 35 and at their upper ends with downwardly inclined brace members 36. Members 35 and 36 are joined to vertically positioned and longitudinally extending plates 37 which are centrally separated and which converge rearwardly of the machine to support the conventional caster wheel 25 from a forked yoke 38. The connection further provides a tow bar 39 for engagement with the tongue 40 of the wagon or like receiving means for the severed crop. The draft mechanism will be seen to provide access for the power takeoff shaft extension 41 suitably driven by the tractor and coupled through universal joint 42 to a gear housing 43 which drives the vertical shaft 44 for imparting rotation to the impeller and the cutter.

As more clearly presented in Fig. 2, the impeller chamber 16 is formed by an outer vertical scroll wall 50 which, as shown in Figs. 5 and 6, starts from a point 51 directly over the inner wall of the crop discharge chute 53 and extends circularly to merge as at 54 with the inner face of the outer side 11. Associated with the vertical wall 50, there is an inwardly extending annular horizontal baffle plate 56 which extends in underlapping relation for the extent of the wall 50 with respect to a circular impeller plate 57 upon which are mounted the four radial fan blades 58 which terminate in vertical fan blades 59. By this arrangement, it will be seen that upon rotation of the plate with the fan blades thereon, air entering through the apertures 27 in the cover is continuously forced in a circular path as directed by the wall 50 to the terminal end of the wall and rearwardly of the side 11. As indicated in Figs. 2 and 8, a downwardly and inwardly inclined baffle 60 extends between the points 54 and 51 to direct the air downwardly from the impeller chamber 16 and against the cutter blades as they move beneath the area bounded by the locations 54 and 51 so that in thus discharging from the chamber 16 the air will strike the blades to assist in doffing the severed crop and will direct such crop rearwardly into the chute 53 and thence upwardly and outwardly for discharge into the waiting vehicle 61. In further consideration of this structure, it will be noted that due to the lapping or inter-fit between the plate 56 and the outer edge of the fan plate 57 whereby downward flow of air is restricted, the impeller blades build up air pressure in their passage from the point 51 to point 54. The air is confined in the plenum chamber and downward pressure of the air is precluded from striking the cutter blades except in the doffing or discharge area between the point 54 and the point 51.

The cutter of the present invention is mounted for rotation with the shaft 44, and hence with the fan plate and fan blades, by intermediately disposed downwardly and outwardly inclined pairs of arms 63 and 64. The inner ends of the arms are secured as by welding in the manner disclosed in Fig. 3, the upper arms 63 being welded to an inner sleeve 65 while the lower arms 64 are welded to a square plate 66. The sleeve 65 is secured to plate 66 by bolts 67 while the square plate 66 is secured to a lower extension 68 of the rotary shaft 44 by bolt 69. As will be noted, the fan plate 57 is engaged by the square plate 66 so that rotation is imparted to the fan assembly with the rotation of the cutter through the shaft 44.

The cutter assembly further comprises blade shanks 76 pivotally mounted at the outer juncture of the arms 63 and 64, their terminal cutting edges lying in a horizontal plane as indicated at 77. By pivotal mounting of the blades, it will be seen that they are maintained radially outward of the arms 63 and 64 by centrifugal force as the structure is rotated; however, in the event of their engaging some unyielding projection, such as rock, stone or stump, the blades may pivotally move to permit passage by such obstruction without danger. After such pivotal movement, the continued rotation of the device will of course restore their radial location and their cutting efficiency.

The invention also provides for the mulching or cutting of the crop after severance from the growing plants. For this purpose, there are provided two substantially U-shaped members 70 having parallel blades 71 which are adapted to pass through parallel apertures in the side 11. Bolts 72 are adapted to engage the members to place the blades 71 in parallel relation above and below the plates 77 of the cutter, thus as the severed material is carried by the cutter blades over the flange 24, the material is passed between the blades 71 which will sever long stalks of material so as to provide a more comminuted food. When use of such comminuting blades is not desired, bolt 72 may be released and the members 70 may be secured on the outer face of the wall 11 if desired.

From the foregoing, it is believed that the general operation of the device will be fully understood by those skilled in the art. Thus it will be apparent that with the tractor properly hitched and the power take-off shaft connected to extension 41, the device can be drawn over the crop with the cutter fan assembly in rotation. In view of the side walls 10 and 11 and their inwardly directed bottom flanges 23 and 24, it will be understood that the cutting operation will be confined to that area bounded between the plates 23 and 24. Thus as the machine traverses the ground and the cutter blades sweep across this area, the crop is severed and is impelled toward the side 11 by the movement of the cutter blades. It is important to note that during such cutting action the air pressure built up in the plenum chamber by the fan is not admitted to the cutting blades and hence the danger of entraining and adhering dirt to the severed crop is minimized. It is also to be noted that, since the side wall 11 protrudes forwardly of the side wall 10, such material as may have a tendency to be impelled outwardly as by centrifugal force is precluded from being discharged sideways from the device. It will be understood that in the travel of the harvester, the broader side structure 11 traverses that area of the field which has previously been cut, and it will further be noted that the narrower side 10 has a reduced flange 23 to preclude undue injury to the uncut forage.

As the cutter blades travel to the terminal point of the plate 56, air induced by rotation of the fan blades 58 and 59 will be caused to travel downwardly by the baffle 60 and will then impinge upon the cutter blades and the crop severed thereby to doff the crop from the blades and to induce its travel rearwardly in the conduit 53 to be discharged into the vehicle 61. By the construction of the present device, it will be seen that the isolation of the air plenum chamber provides for the effective and efficient application of the moving air at the area of discharge of the forage from the cutter blades and hence precludes loss of air pressure and the possibility of entrainment of dirt and foreign matter by the flow of air in the cutting area. It will further be seen that by the forward projection of the side 11, the crop is precluded from side discharge from the apparatus. The inward projection of the flanges 23 and 24 restricts the cutting area to the most effective and efficient for the apparatus and further precludes the entry of dirt with the severed crop. It will be noted that in the construction of the cutting blades with their pivotal mountings that in the event of their striking stones, stumps or like obstructions they will yield and permit the device to travel without damage to the blades. It will further be noted that by the provision of the insertable mulching blades 70 that if desired the crop may be further cut as an incident to the original severing of the crop from the growing plants.

In the construction of the apparatus, it will of course be understood that the details herein presented are shown by way of illustration, and in the manufacture of the device numerous changes, modifications and the full use of equivalents may be resorted to without departure from the spirit or scope of the invention as defined in the appended claims.

We claim:

1. In a rotary harvester, a body defining an upper air impeller chamber and a lower forage cutting chamber, a baffle separating said chambers, and means operatively associated with said impeller chamber for delivering air under pressure downwardly from said impeller chamber to an arcuately restricted peripheral area of said cutting chamber.

2. In a rotary harvester, a body defining an upper air impeller chamber and an adjacent lower forage cutting chamber, and a baffle separating said chambers, and means operatively associated with said impeller chamber for delivering air under pressure downwardly from an arcuately restricted area of the periphery of said impeller chamber to an arcuately restricted area of the periphery of said cutting chamber.

3. In a rotary harvester, a body defining an upper air impeller chamber and a lower adjacent forage cutting chamber, and a baffle separating said chambers, means operatively associated with said impeller chamber for delivering air under pressure downwardly from an arcuately restricted area of the periphery of said impeller chamber to an arcuately restricted area of the periphery of said cutting chamber, and means operatively associated with said cutting chamber precluding passage of air from said cutting chamber to the ground.

4. In a rotary harvester, a body defining an upper air impeller chamber and an adjacent lower forage cutting chamber, a baffle separating said chambers, said impeller chamber and said cutting chamber being in superposed coaxial relation, said cutting chamber defining a forward cutting area not exceeding the width of said chamber, and means operatively associated with said impeller chamber for delivering air under pressure downwardly from said impeller chamber to an arcuately restricted area of said cutting chamber, said restricted area being adjacent to but removed from the cutting area.

5. In rotary harvester, a housing defining a plurality of chambers comprising an upper air impeller chamber and a lower forage cutting chamber, said chambers being in superposed coaxial relation, a partition between said chambers precluding passage of air from said upper chamber for a major portion of the arcuate extent of said chambers, and means operatively associated with said impeller chamber for delivering air under pressure downwardly from said impeller chamber to an arcuately restricted area of said cutting chamber, said means comprising an interconnecting passage between said chambers at one side thereof.

6. A green forage harvester including a casing defining upper and lower portions, a rotary air impeller in the upper portion of said casing for impelling air downwardly, a coaxial rotary cutter in the lower portion of said casing, and a partition between said portions limiting the passage of air downwardly from said upper portion to said cutter at a point in the path of cutter travel remote and rearward from the area of cutting action.

7. A green forage harvester including a casing defining an upper chamber and a lower chamber, a rotary air impeller in the upper chamber of said casing for impelling air downwardly, a coaxial rotary cutter in the lower chamber of said casing, and means operatively associated with said upper chamber for restricting air flow from said upper chamber to said cutter at a peripheral zone in the path of cutter travel rearward from the area of cutting action and substantially at the end of the area of cutting action, said casing having a crop discharge opening from said lower chamber adjacent the zone of delivery of air to said lower chamber.

8. A green forage harvester including a casing having an air inlet opening in the top thereof and defining an upper air impeller chamber, a lower forage harvesting chamber having a forward cutting area, a rotary air impeller in the upper chamber of said casing for supplying air downwardly into said lower chamber, a coaxial rotary cutter in the lower chamber of said casing, a horizontal partition separating said chambers, and means operatively associated with said upper chamber for directing air flow from said upper chamber to said cutter at a restricted peripheral zone in the path of cutter travel rearward from the area of cutting action, said casing having a crop discharge opening adjacent the zone of delivery of air to the cutter.

9. A green forage harvester including a casing having an air inlet opening in the top thereof and defining an upper air impeller chamber, a lower forage harvesting chamber having a forward cutting area, a rotary air impeller in the upper chamber of said casing for supplying air under pressure to said lower forage harvesting chamber, a coaxial rotary cutter in the lower chamber of said casing, a horizontal partition separating said chambers, and means operatively associated with said upper chamber for directing air flow from said upper chamber downwardly onto said cutter at a restricted peripheral area in the path of cutter travel substantially at the end of the area of cutting action, said casing having a crop discharge opening from said lower forage harvesting chamber adjacent the point of delivery of air to the cutter, and means operatively associated with said impeller chamber for directing substantially all of the air from said impeller chamber to said crop discharge opening.

10. A green forage harvester including a casing having an air inlet opening in the top thereof and defining an upper air impeller chamber, a lower forage harvesting chamber having a forward cutting area, a rotary air impeller in the upper chamber of said casing for supplying air under pressure to said lower forage harvesting chamber, a coaxial rotary cutter in the lower chamber of said casing, a horizontal partition separating said chambers and means operatively associated with said upper chamber for directing air flow from said upper chamber downward onto said cutter at a restricted peripheral area in the path of cutter travel rearward from the area of cutting action and substantially at the end of the area of cutting action, said casing having a crop discharge opening from said lower forage harvesting chamber adjacent the zone of delivery of air to the cutter, and means operatively associated with said impeller chamber for directing air from said impeller chamber to said crop discharge opening, said restricted peripheral area coinciding with an area of rearward travel of the blade whereby air impinged thereon from said upper air impeller chamber will assist in doffing the crop from the blade and delivering it to said opening.

11. A harvester including a casing having side and rear walls defining a crop cutting and delivery chamber including areas of forward-transverse and side-rearward motion of a rotary cutter therein and wherein crop severance is substantially confined to said forward-transverse area, said casing also defining an air impeller chamber above said crop cutting and delivery chamber and including a major pressure buildup area and a minor pressure discharge area, and air impeller means mounted in said air impeller chamber for delivering air downwardly from said air impeller chamber to said crop cutting and delivery chamber, said discharge area being in registration with said area of side-rearward motion for passage of air from said air impeller chamber to said crop cutting and delivery chamber to assist in doffing severed crops from said rotary cutter and delivering said severed crops from said crop cutting and delivery chamber.

12. A harvester including a casing having top, side and rear walls defining a crop cutting and delivery chamber and an air impeller chamber above said crop cutting and delivery chamber, horizontal means effectively separating said chambers, a rotary air impeller in said impeller chamber for supplying air under pressure from the impeller chamber to the cutting chamber, a coaxial rotary cutter in said cutting chamber, and a single drive shaft for said impeller and said cutter, said means including a fixed baffle and a rotary air impeller disc, said baffle extending inwardly from the casing walls with its inner edge underlying the peripheral edge of said disc and defining a peripheral passage for the downward passage of air from the impeller chamber to the cutting chamber rearwardly of the said drive shaft.

13. A harvester including a casing having top, side and rear walls defining a crop cutting and delivery chamber and an air impeller chamber above said crop cutting and delivery chamber, horizontal means effectively separating said chambers, a rotary air impeller in said impeller chamber for supplying air under pressure from the impeller chamber to the cutting chamber, a coaxial rotary cutter in said cutting chamber including cutting blade tips, the path of travel of said tips being radially beyond the path of travel of said air impeller, and a single drive shaft for said impeller and said cutter, said means including a fixed baffle and a rotary air impeller disc, said baffle extending inwardly from the casing walls with its inner edge underlying the peripheral edge of said disc and defining a passage for the downward passage of air from the impeller chamber to the cutting chamber registering with the path of travel of said cutting blade tips at a zone where said tips travel rearwardly in said casing.

14. A harvester including a casing having top, side and rear walls defining a crop cutting and delivery chamber and an air impeller chamber above said crop cutting and delivery chamber, horizontal means effectively separating said chambers, a rotary air impeller in said impeller chamber for supplying air under pressure from the impeller chamber to the cutting chamber, a rotary cutter in said cutting chamber, and a single drive shaft for said impeller and said cutter, said means including a fixed baffle and a rotary air impeller disc, said baffle extending inwardly from the casing walls with its inner edge underlying the peripheral edge of said disc and defining a passage for the downward passage of air from the impeller chamber to the cutting chamber outwardly of said disc.

15. In a harvester for cutting and harvesting growing crops, a casing having side walls and a rear end wall, inwardly extending horizontal flanges at the lower edges of said walls, one of said side walls extending forwardly beyond the opposite side wall, the flange of said forwardly extending wall being wider than the flange of the opposite wall, and a rotary cutter having radial blades housed within said walls, a part of the path of travel of said blades being over said wider flange, said blades being pivotally mounted and yieldably retained in radial position by centrifugal force, said casing also defining a superposed air impeller chamber, a rotary air impeller means in said chamber for supplying air under pressure downwardly onto said blades to assist in doffing cut crops and delivering same from said harvester, and a single drive shaft for both said cutter and said impeller.

References Cited in the file of this patent
UNITED STATES PATENTS

| | | |
|---|---|---|
| 2,557,598 | Daggett | June 19, 1951 |
| 2,720,070 | Arrington | Oct. 11, 1955 |
| 2,737,003 | Beers | Mar. 6, 1956 |
| 2,777,270 | Colclazier | Jan. 15, 1957 |
| 2,779,146 | Mitchell et al. | Jan. 29, 1957 |